UNITED STATES PATENT OFFICE.

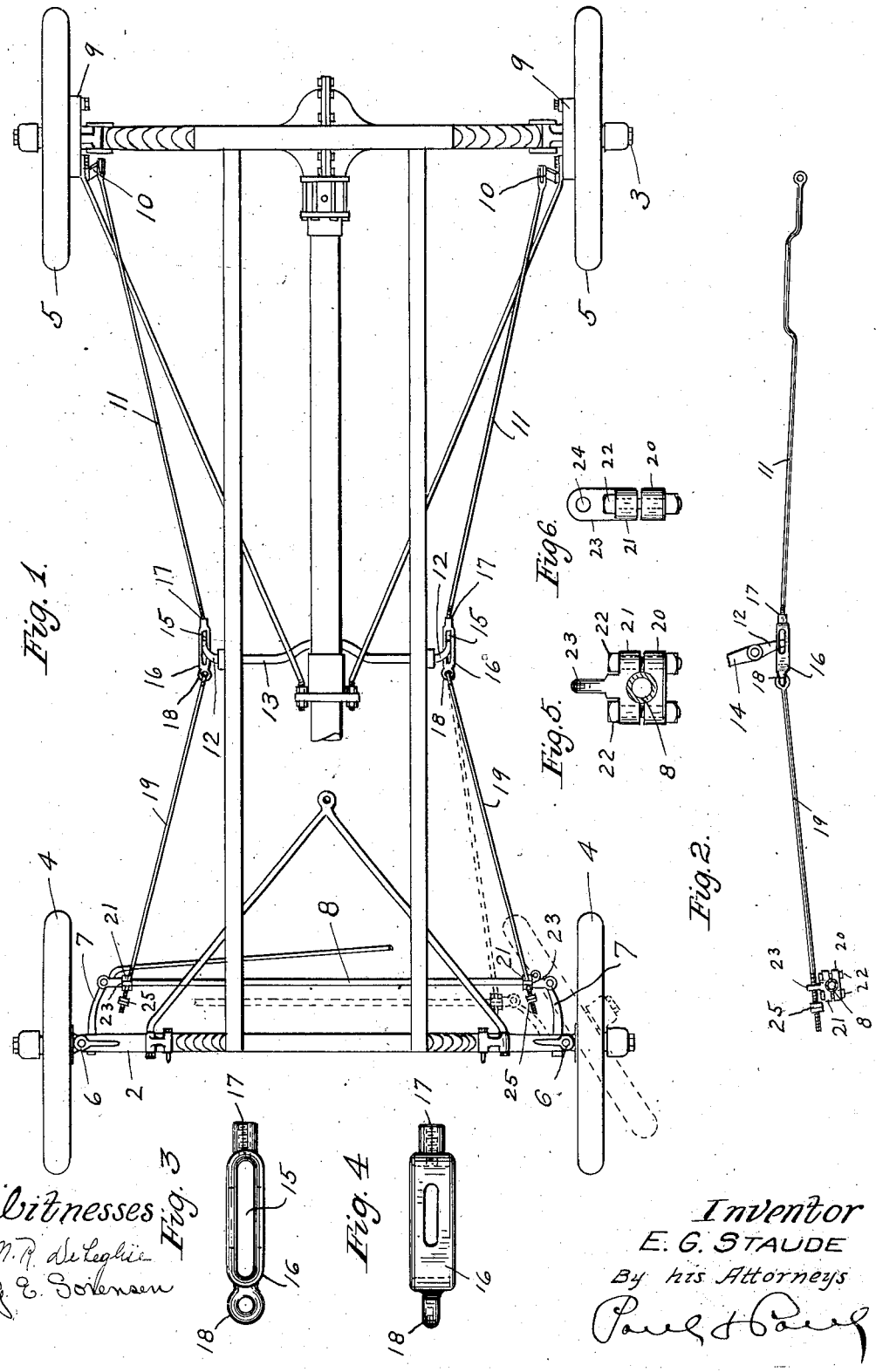

EDWIN G. STAUDE, OF MINNEAPOLIS, MINNESOTA.

STEERING-GEAR ATTACHMENT.

1,333,347.  Specification of Letters Patent.  Patented Mar. 9, 1920.

Application filed May 27, 1918. Serial No. 236,778.

*To all whom it may concern:*

Be it known that I, EDWIN G. STAUDE, a citizen of the United States, resident of Minneapolis, county of Hennepin, State of Minnesota, have invented certain new and useful Improvements in Steering-Gear Attachments, of which the following is a specification.

The object of my invention is to provide an attachment for the steering gear of a power propelled vehicle to connect it with the brake bands and enable the driver to turn the machine in a smaller space or at a more acute angle than ordinarily has been possible in machines of this kind.

A further object is to provide a steering gear attachment capable of application to automobiles and trucks generally but particularly adapted for the Ford style of car.

The invention consists generally in various constructions and combinations, all as hereinafter described and particularly pointed out in the claims.

In the accompanying drawings forming part of this specification,

Figure 1 is a plan view of the chassis of the car with my invention applied thereto, Fig. 2 is a side view, showing the means of connection of the attachment with the brake rods and the steering gear cross rod, Figs. 3 and 4 are detail views of the coupling between the brake rod and the steering gear attachment, Figs. 5 and 6 are detail views showing the means for mounting the attachment on the steering gear cross rod.

In the drawing, 2 and 3 represent the forward and rear axles, having carrying wheels 4 and 5. The spindles of the forward wheels have the usual knuckle joints at 6, with arms 7 between which, extending across the machine, is a connecting rod or bar 8 for simultaneous movement of the wheels, as usual in machines of this type. At the rear of the machine are the usual brake drums 9 and the connections 10 for the brake straps and brake rods 11 extending forwardly from said connections to the depending arms 12 of a cross bar 13 which is operated through the movement of a brake lever 14 in the usual way. The arms 12 fit within slots 15 provided in links 16 into one end of which the rods 11 are tapped, as at 17. The other ends of the links have eyes 18 formed thereon to receive the rear ends of rods 19 which extend forwardly from said links and are mounted on the cross rod 8 by means of clamps composed of lower members 20 and upper members 21 secured together by bolts 22. The upper members 21 have ears 23 thereon with holes 24 therein to receive the forward ends of the said rods 19 for longitudinal movement therein, said ends having nuts 25 for limiting such movement in one direction. These rods 19 will, of course, follow the movement of the cross rod 8 as the forward wheels are oscillated on a vertical axis to steer the machine and their position on the cross rods with respect to the vertical axis of the knuckle joints is such that when the wheels are oscillated one rod will be drawn forwardly to move the brake, while the rod 19 on the opposite side of the machine will be moved backwardly to impart a corresponding movement of its brake rod and release the brake on that side of the machine. One rear wheel, therefor, will be set and the other one released and the wheel that is set will form a fulcrum or bearing on which the machine can make a very short turn. Evidently the arms 12 fitting within the slots 15 will allow for such forward and backward movement of the brake rods without the necessity of moving the brake lever.

This invention is particularly applicable where an automobile is converted into a tractor, as the driver can readily steer the machine around a stump or tree or other obstruction on the field and make a comparatively short turn, or much shorter than would be possible where there is no connection between the steering rigging and the brake rods.

I do not confine myself to the particular means shown for connecting the steering rigging with the brake rods. Any suitable mechanism may be employed for this purpose, the broad idea of my invention being the operation of one brake or the other through the oscillation of the forward wheels in steering the machine.

I claim as my invention:

1. The combination, with a power propelled vehicle having forward and rear wheels and brakes for said rear wheels and a steering rigging for said forward wheels, of brake rods connected to said brakes and extending forwardly therefrom, means connected with said brake rods and having a movable connection at their forward ends with said steering rigging, the movement of said steering rigging to oscillate said forward wheels in one direction operating said brake rod to set the brake on one side of the machine and release it on the other and the movement of said steering rigging to turn the machine in the other direction reversing the movement of said brake rods.

2. The combination, with a power propelled vehicle having forward and rear wheels and brake drums and bands for said rear wheels and a steering rigging for said forward wheels, of brake rods connected to said brake bands and extended forwardly therefrom and having means for connection with the brake lever, and means connected with said brake rods and having a sliding connection at their forward ends with said steering rigging, the movement of said steering rigging to oscillate said forward wheels in one direction operating said brake rod to set the brake on one side of the machine and release it on the other, and the movement of said steering rigging to turn the machine in the other direction reversing the movement of said brake rods.

3. The combination, with a power propelled vehicle having forward and rear wheels, brake drums and brake bands for said rear wheels and brake rods connected thereto, couplings connected to said brake rods, brake lever connections having a sliding bearing in said couplings and rods connecting said couplings with the steering rigging of said forward wheels, whereby movement of said steering rigging to oscillate said wheels in either direction will alternately set said brake bands.

4. The combination, with a power propelled vehicle having forward and rear carrying wheels and a steering rigging for said forward wheels, brake drums and bands for said rear wheels and rods connected with said brake bands, couplings attached to said rods and having means for connection with the brake lever, rods pivotally connected with said couplings and having a sliding bearing at their forward ends on the cross rod of said steering rigging, oscillation of said forward wheels to steer the machine setting the brake on one side or the other of the machine independently of the movement of said brake lever.

5. The combination, with a power propelled vehicle having forward and rear carrying wheels and a steering rigging for said forward wheels and brake devices for said rear wheels and rods connected with said brake devices, couplings attached to said rods and having means for connection with a brake lever, rods pivotally connected to said couplings and having movable bearings on said steering rigging, oscillation of said forward wheels to steer the machine setting the brake on one side or the other of the machine independently of the movement of said brake lever.

6. The combination, with a power propelled vehicle having forward and rear wheels and brakes for said rear wheels, and brake rods connected thereto, of couplings connected to said brake rods, a brake lever mounted for movement in said couplings and rods connecting said couplings with the steering rigging of said forward wheels, whereby movement of said steering rigging to oscillate said wheels in either direction will alternately set said brake bands.

In witness whereof I have hereunto set my hand this 18th day of May, 1918.

EDWIN G. STAUDE.